Dec. 21, 1965  W. J. SCAVUZZO ET AL  3,224,585
THROWAWAY FILTER ARRANGEMENT
Filed Aug. 24, 1961  3 Sheets-Sheet 1
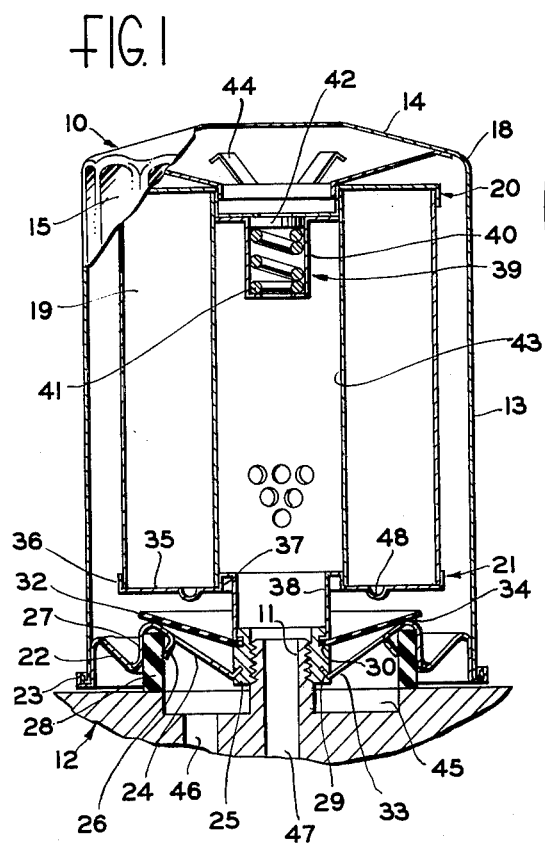
FIG.1
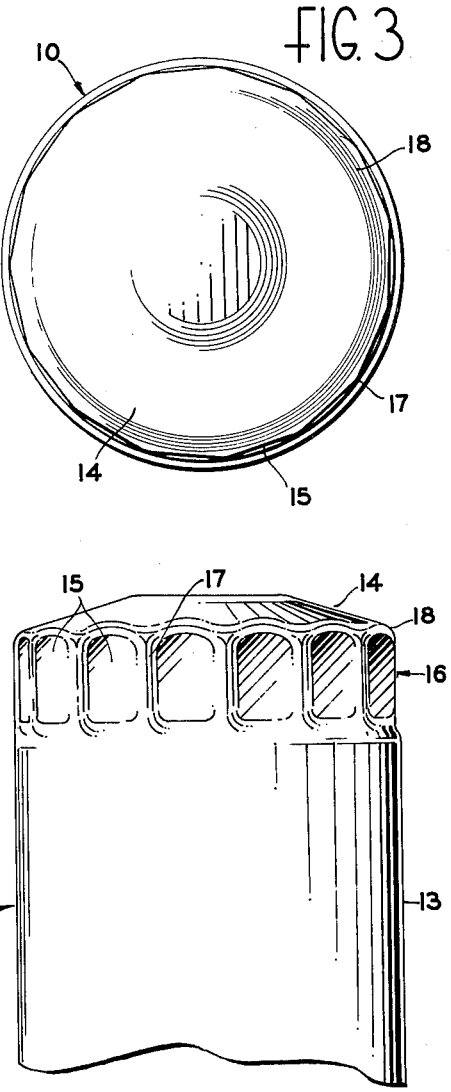
FIG.3
FIG.4
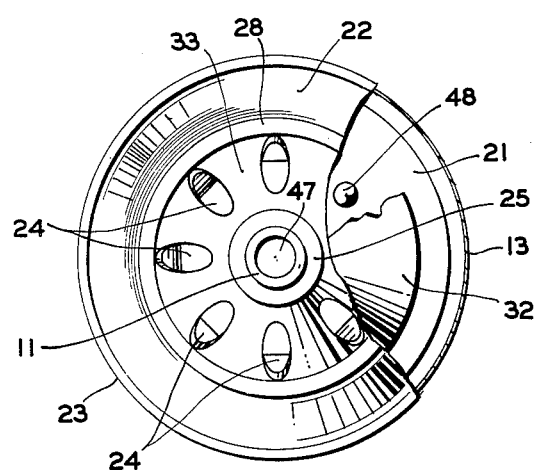
FIG.2
INVENTOR.
WILLIAM J. SCAVUZZO
ALBERT WALULIK
BY CHARLES J. CASALEGGI
ATTORNEYS Dec. 21, 1965 W. J. SCAVUZZO ET AL 3,224,585
THROWAWAY FILTER ARRANGEMENT
Filed Aug. 24, 1961 3 Sheets-Sheet 2
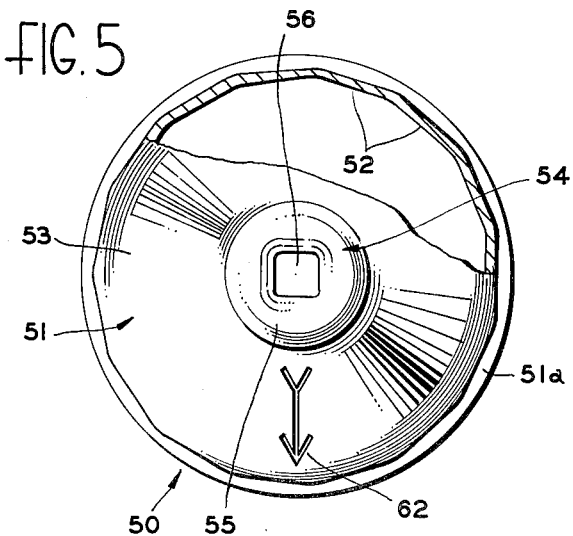
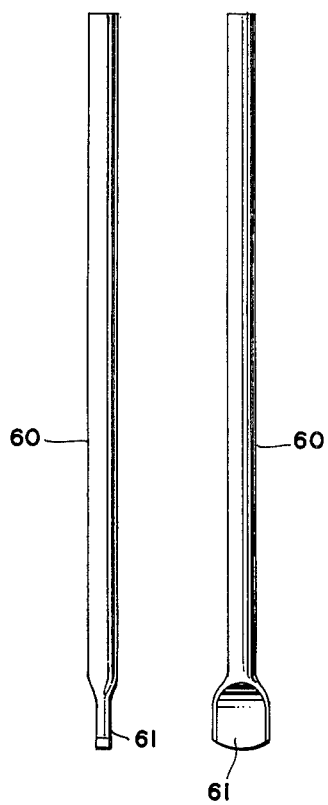
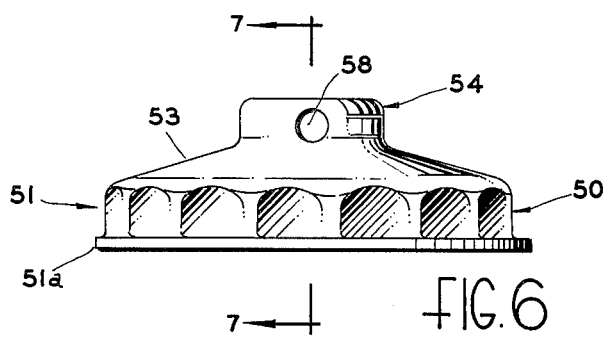
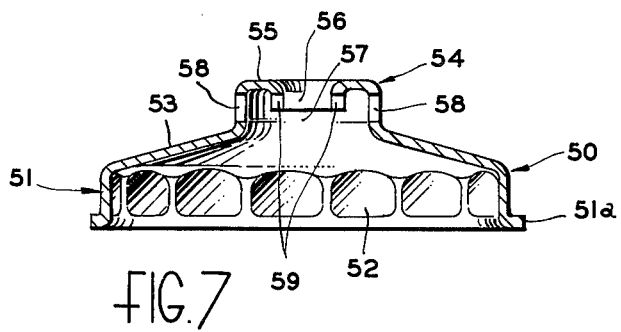
INVENTOR.
WILLIAM J. SCAVUZZO
ALBERT WALULIK
BY CHARLES J. CASALEGGI
ATTORNEYS

*INVENTOR.*
WILLIAM J. SCAVUZZO
ALBERT WALULIK
BY CHARLES J. CASALEGGI

*ATTORNEYS*

United States Patent Office 3,224,585
Patented Dec. 21, 1965

3,224,585
THROWAWAY FILTER ARRANGEMENT
William J. Scavuzzo, Clark, Albert Walulik, Cranford, and Charles J. Casaleggi, Middletown, N.J., assignors to Purolator Products, Inc., Rahway, N.J., a corporation of Delaware
Filed Aug. 24, 1961, Ser. No. 133,634
3 Claims. (Cl. 210—232)

This invention relates to a throwaway type filter including an accessory arrangement for installing and dismounting the filter from an engine block.

Screw-on type throwaway filters generally include a filter element enclosed in a sealed can or outer casing and a threaded boss in the base of the element surrounded by a gasket which permits the cartridge as a unit to be screwed onto a bushing protruding from the engine block so that the sealing gasket forms a fluid-tight seal between the throwaway unit and the engine block. When the filter element in this unit becomes clogged, the entire filter is removed from the bushing and is discarded.

In the past, the enclosing can has been made of relatively heavy gauge metal. Thus, it could be readily gripped for hand-tightening of the filter into place on the engine bushing to provide an effective seal between its gasket and the engine and likewise for hand removal. In the alternative to hand tightening, common clamp type or common pipe wrench or strap-tightening devices could be used to grip the periphery of the can, both for tightening and for removal operations.

However, since a throwaway type filter is intended to be discarded at the end of its useful life, all its components in assembly must be cheap enough to make this economically feasible. One of the major economies can be effected by making the enclosing can or container of the throwaway filter of the very thin gauge metal, for example, .015 inch thick. However, when such a substitution of thin gauge metal for the container or can is effected, as a replacement for much heavier gauge metals for cans heretofore used, problems involving the installation and removal of such thin gauge can units are introduced which did not exist with the heavier gauge cans.

For example, proper tightening of the unit during installation to effect an appropriate seal between its gasket and the engine block is required. It is necessary, therefore, to provide service men with some sort of a guide to facilitate installation. Moreover, if the unit has been on the engine for a long time, a tendency for adhesion between the gasket and the engine block occurs which makes it difficult to remove the unit. Since the filter can is of large diameter and of the thin gauge mentioned, both these problems are difficult to cope with. Hand manipulation both for tightening or removal will not be effective because the thin gauge metal can yields under hand pressure. Likewise, if attempts are made to use strap, clamp, or pipe wrench assists, or other conventional removal and applying tools, the thin gauge can crushes or distorts or is destroyed. This makes use of such tools either entirely impossible, ineffective or at best haphazard.

A solution for the problems can be found in providing a portion of the usually cylindrical thin gauge metal can with a polygonal nut-like configuration preferably contiguous to its outer closed end to which a special wrench-like accessory may be applied, both for tightening installation and for unloosening and removal of the throwaway filter.

However, when the container or can is of very thin gauge metal, it "breathes" i.e., expands and contracts with pressure changes in the engine oil system. This "breathing" places limitations on the contour of the can. It is necessary to avoid sharp corners in the can that would bend back and forth during "breathing" with consequent risk of rupture at such locations due to metal fatigue. In other words, the dangers of fatigue failure must be avoided. This means that in providing the polygonal nut-like configuration on the can, it should have many sides or flats so that it still approximates a cylindrical contour while providing a polygonal shape that will accept a socket-like wrench accessory. The minimum number of flats which will provide this requirement will depend upon the can diameter and on the need to keep the angle between each flat and an adjacent flat to a maximum. In other words, sharp corners must be avoided between adjoining flats. For example, with a can diameter somewhat in excess of 3½ inches, the flats forming the polygonal configuration are, for example, 15 in number, and the wide angle between adjacent flats approximates 156°.

Furthermore, avoidance of stress concentrations of a destructive nature at the polygonal nut-like portion of the can is effected by the use of rounded terminations between the junctions of the flats and the can body and its closed outer end. The extent of rounding while relatively small is sufficient to avoid stress concentration of a destructive nature.

The filter with a thin gauge can having the polygonal nut-like portion just mentioned, is provided with a removable accessory of heavy gauge material (preferably metal) which performs the function of a socket wrench in conjunction with the polygonal nut-like portion of the can. This accessory has flats corresponding in number to those on the can and is adapted to fit removably as a cap over its outer closed end into engagement with its flats, affording a good grip on the latter. Thus, when the wrench accessory is rotated, a socket wrench and nut effect is provided, the can acting as the nut. When the wrench accessory is rotated, the large number of flats on it and on the can which it engages are advantageous because they more uniformly distribute the turning torque to the thin gauge filter can in tightening and in removal, preventing distortion or destruction thereof.

To facilitate rotation of the socket wrench accessory, it is provided with a hub which has an axially-located square hole which is adapted to receive the conventional stub of a lever tool such as a ratchet or torque wrench. With a torque wrench, the service man can then apply a prescribed tightening torque or a loosening torque. On the other hand, if only a ratchet wrench is available, in installation, he is instructed to rotate the filter by hand onto the bushing of the engine block until the gasket makes contact with the latter. Thereafter, the filter is given a predetermined additional tightening rotation of a prescribed number of additional turns or fractions thereof by rotating the accessory with the ratchet wrench. To this end, an arrow or other guide mark is provided on the outer surface of the wrench accessory to assist in determining the extent of additional rotation. The ratchet wrench can also be used for loosening the filter for removal.

As an additional means for rotating the wrench accessory, its hub is provided with transverse holes through which another lever tool, such as a lever bar or rod, may be inserted to provide a wrench handle, also for tightening or loosening purposes. This handle may be used in conjunction with the guide markings previously mentioned during installation of the filter. The handle is headed as by flattening at one end so that it will not slide clear through the transverse holes when it is manipulated for tightening or loosening purposes.

It can be seen, therefore, that the primary objects and features of this invention are the provision of a throwaway type screw-on filter utilizing a very thin gauge metal enclosing can provided with a polygonal nut-like shaped portion together with a removable wrench-like accessory which may be used to tighten the filter in installation on the engine and for loosening it on removal from the engine while avoiding the dangers of fatigue failure in the can, and wherein uniform distribution of torque stress to a thin gauge filter can be effected to avoid crushing or distortion. This eases the problems of installation and also of removal, particularly in the latter event if sticking exists between the gasket of the filter and the engine block, a condition most likely to exist if the filter has been on the engine block for any great length of time, e.g., a year or more.

Other objects and features of the invention are the provision of a screw-on throwaway filter having a novel can body construction and equipped with a novel wrench accessory which will facilitate installation and removal of the filter.

Further objects and features of the invention are the provision of a filter in which it is practicable to utilize a thin gauge metal can to enclose the filter element.

Other objects and features of the invention are the provision of a throwaway filter that is cheap enough to be discarded when the filter element becomes clogged.

Other objects and features of the invention will become apparent from the following specification and the accompanying drawings, wherein:

FIG. 1 is a longitudinally sectioned view of a filter embodying the invention;

FIG. 2 is a partly cross-sectioned plan view of the end of the filter that attaches to the engine block;

FIG. 3 is a plan view showing the outer end;

FIG. 4 is an elevational view showing the outer end portion;

FIG. 5 is a partly cross-sectioned plan view of the accessory;

FIG. 6 is an elevational view of the accessory;

FIG. 7 is a longitudinally sectioned view of the accessory; and,

FIG. 8 is an elevational view of the handle for the accessory.

Figure 9:
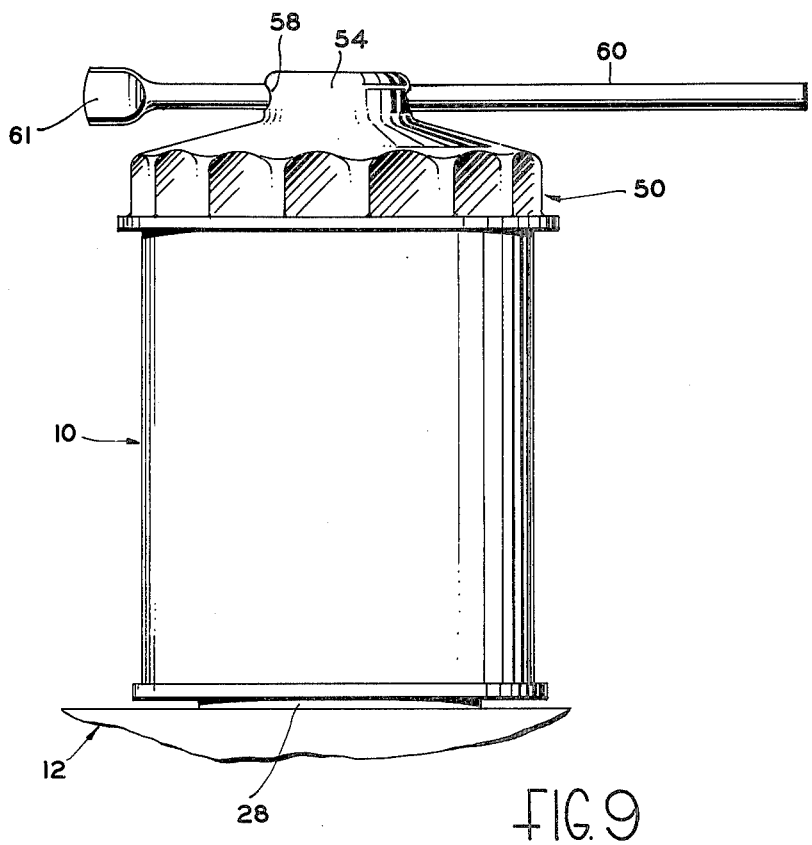
Figure 10:
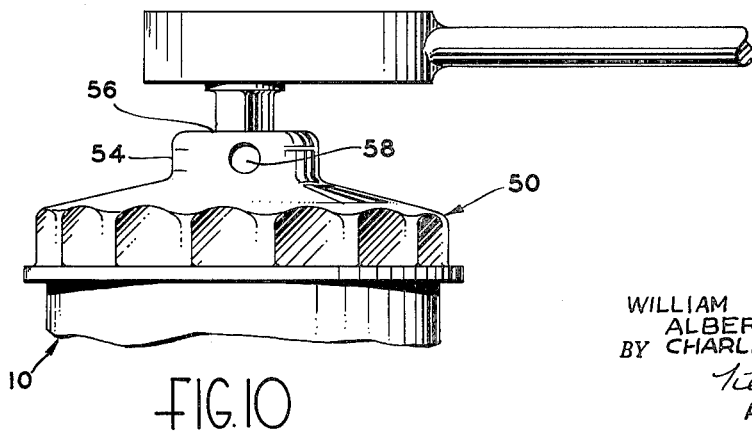

This filter is an oil filter of the type sealed together as a unit which is screwed on an automobile or truck engine or the like for use, and unscrewed and thrown away when it is desired to renew the filter element. A corresponding new unit is screwed on for subsequent use.

Referring to the drawing, the reference numeral 10 generally designates a screw-on throwaway type filter which is adapted to be screwed onto a threaded bushing 11 extending from an engine block 12. The filter 10 comprises a cup-shaped substantially cylindrical container shell or can 13 formed of very thin gauge sheet metal, for example, of the order of approximately .015″ thickness. This shell or can is preferably drawn to the shape shown and has a convex integral closed end portion 14. The side wall portion of the can adjacent this end portion 14 is provided with a plurality of flat surfaces or flats 15 providing a polygonal nut-like configuration 16 adjacent the end portion 14. The number of these flats 15 is large so that the general overall circular contour in section of the can 13 at the end portion 14 is generally retained in approximation, and sharp corners between adjacent flats is avoided to eliminate the danger of stress fatigue in the filter can 13 and rupture dangers hereinabove discussed. As pointed out above, but without limitation thereto, a polygon with fifteen sides or flats 15 inscribed in the circumscribing circle defining the circular contour in section of the can 13 is found effective when the can diameter is approximately 3.5+ inches. In such disposition, the angle between adjacent flats 15 is very wide being approximately 156°. This wide angle insures that the junctions 17 between adjacent flats are not sharp corners. This avoids the fatigue problems mentioned.

The overall configuration of the closed end portion 14 is generally convex. The junction 18 between this end portion 14 and the integral cylindrical wall portion is well rounded an the angle at the junction is considerably in excess of 90°.

An annular, resin-impregnated pleated filter paper element 19 is disposed within the can or casing 13, said element having an upper end cap 20 and a lower end cap 21 sealing off the opposite ends of the peats. Any other suitable type of filter element may be used. The filter element 19 is permanently sealed within the can 13 by a thin sheet metal bottom member or base 22 generally closing off the open end of can 13. The can 13 and closure member 22 are provided with corresponding lips rolled together to form an oil-tight lock seam 23 so that the filter element 19 is permanently enclosed in the can or container 13.

Closure member 22 is provided with circumferentially spaced inlet ports 24 disposed around an internally threaded central nipple or boss 25 extending into the can 13 which forms an oil discharge for the can. Inlet ports 24 are formed in the sheet metal closure member 22, for example, by piercing it to form a downwardly and outwardly extending tongue 26 adjacent each inlet port 24. Tongues 26 hold an annular sealing gasket 28 in place on the closure member 22 pressing it against an annular rib 27 formed in said closure member. The sealing gasket 28 is thus supported concentrically about the nipple or boss 25 and when the latter is screwed onto the bushing 11 of the engine block 12 provides a seal therewith.

The central boss 25 is provided with a slot 29 in its outer periphery into which the inner periphery of the closure member 22 is inserted, being secured therein by conventional metal working methods. An annular shoulder 30 is provided on the boss 25 and an annular rubber-like disk 32 is mounted on the boss 25 and seats on said shoulder 30. This disk 32 performs the function of an anti-drainback valve to prevent drainback of oil from the can 13, via the ports 24 when the engine is at rest. To facilitate this anti-drainback function, the closure member 22 has a conical tension band portion 33 adjoining the boss 25 and joined to the rib 28 defining a seat 34 at the junction against which the peripheral portion of anti-drainback disc 32 seats.

The lower end cap 21 of the filter element comprises an annular metal trough 35 with upturned inner and outer rims 36, 37 and having a depending central sleeve 38 which fits over the central boss 25 and seats against the inner surface of the anti-drainback valve 32. Shoulder 30 is positioned on boss 25 so that it lies below the seat 34 of tension band 33 so that anti-drainback disc 32 is normally maintained in a cone-shaped configuration. It has been found that the disc 32 must be of resilient rubber-like material having a "Shore A" durometer reading of between substantially 60 to 90 units so that a tension is set up in it when it is deformed into conical configuration and it will continuously seek to flatten out or return to its free normal shape and thereby form a liquid-tight seal with the seat 34. The thickness of the anti-drainback disc 32 is preferably .042 to .078 inch.

A conventional by-pass valve 39 comprising a sleeve 40, a compression spring 41 therein an a valve disc 42 is disposed in the conventional center tube 43 of the filter element 19. The filter element 19 is maintained seated against the anti-drainback disc 32 on the central boss 25 by a metal spider 44 located internally at the upper closed end 14 of the can 13.

When the filter is threaded onto the bushing 11 of the engine block by means of boss 25, the sealing gasket 28 forms a fluid-tight seal to prevent oil leakage between the filter and the engine block. An annular recess 45 is formed in the engine block 12 around bushing 11 and inwardly of gasket 28. This recess 45 communicates with an oil inlet passageway 46 which receives oil from the engine oil pump and crankcase (both not shown). The bushing 11 provides an oil discharge passage 47 in the engine blocks 12 in communication with the engine parts (not shown) which require lubrication.

Pumped oil flows into the filter can 13 from recess 45 through inlet ports 24. The pressure of the oil lifts the periphery of the anti-drainback disc 32 away from the seat 34 so that oil flows under and around the outer periphery of the disc 32 into the can 13. The oil then passes in an outside-in direction through the filter element 19 and is discharged through the center tube 43 and bushing 11 to the engine parts. The end cap 21 is provided with circumferentially spaced protuberances 48 on the bottom of trough 36 to prevent the displaced open anti-drainback valve disc 32 from accidentally seating against said cap and possibly sticking thereagainst.

When the engine is shut off, the oil pressure ceases and the anti-drainback disc 32 reseats itself on seat 34 as it is under tension as described, attempting to return to a flat annular shape, forming an oil-tight seal with said seat 34. Thus, any oil in the filter can 13 or in bushing 11 and the engine parts will not drain back through inlet ports 24 to the engine crankcase or oil pump.

The filter 10 described includes the anti-drainback valve disc 32. However, in situations where drainback is no problem, this anti-drainback valve disc 32 may be eliminated.

The throwaway type filter 10 which has just been described is provided with an accessory tool or member to facilitate its tightening onto the bushing 11 to effect the requisite seal between gasket 28 and the engine block 12 and also to facilitate its removal for replacement. In the embodiment shown, this accessory tool 50 comprises a socket-like tubular part 51 of relatively heavy gauge metal, for example, .078″ cold rolled steel. This socket-like part 51 is intended to fit removably over the polygonal nut-like configuration 16 at the outer or closed end 14 of the filter can or container 13. Its side wall has a complemental nut-like configuration and the same number of flats 52 as the number of flats 15 provided on can 13 so that when the socket part 51 is mounted on the nut-like configuration 16 of can 13, each of the flats 52 will intimately engage a corresponding flat 15 of the can 13 affording a good grip on the latter so that the can 13 can be rotated by rotating the socket part 51.

A reinforcing, outwardly-directed, integral annular flange 51a is provided at the open end of socket part 51. The other end of socket part 51 is closed off by an integral cover-like part 53, whose walls internally have generally a contour such that when the socket part 51 is mounted on the nut-like configuration 16 of the can 13, the cover-like part 53 will rest snugly like a cap on the closed end 14 of the can 13. The cover-like part 53 terminates in an integral, generally cylindrical, hollow central hub 54. An integral end wall 55 closes the outward end of hub 54. This end wall has a square, centrally located hole 56 stamped therein, the act of stamping providing an inwardly extending, integral reinforcing flange 57 around the perimeter of the square hole 56. This square hole 56 is dimensioned to receive removably the conventional operating stub of a lever tool such as a ratchet or torque wrench (not shown). In practice, such a stub is approximately ½ inch square and the hole 56 is dimensioned to permit such stub to be readily inserted so that the ratchet or torque wrench can be used to apply turning torque to the accessory 50 and its socket part 51.

Diametrically disposed holes 58 in the wall of hub 54 and clearance cuts 59 in the reinforcing flange 57 are also provided so that another form of lever tool comprising an operating lever or handle 60 can be freely passed diametrically of the hub through these holes 58 and clearances 59, and when so mounted be used as a lever or handle to rotate the socket part 51. The lever or handle 60 is preferably a cold rolled steel bar or circular cross-section dimensioned to fit slidably through the holes 58 and clearances 59. One end of this handle is provided with an enlargement or head 61 formed as by flattening. This head 61 is of larger dimensions than the holes 58 so that it will prevent the handle or lever rod 60 from sliding clear through the holes 58 when it is temporarily mounted on the hub 54 for exerting torquing leverage on the socket part 51. Either the handle 60 passed through holes 58 of hub 54 or a torque or ratchet wrench whose operating stub is inserted in the square hole 56 in the hub 54 can be used to rotate the wrench accessory 50.

A guide mark, for example, in the form of an arrow 62 is provided on the outer surface of the cover part 53 of the accessory 50. This arrow 62 is radially directed and its head points outwardly toward the outer periphery of the socket part 51 of the wrench accessory 50. This guide mark 62 can be formed by stamping or in any other suitable way. The entire accessory 50 is preferably die formed from a single piece of heavy gauge metal, e.g., .078″ cold rolled steel. It may be made of other metals, by other metal working procedures, or be of any other suitable materials of sufficient strength and permanance.

In practicing the invention, the filter 10 has its boss 25 screwed onto the stud 11 until the gasket 28 first makes contact with the engine block 12 or an appropriate pad (not shown) thereon. Then, the wrench accessory 50 is applied as a cap to the nut-like formation 16 at the closed end of the filter can 13. If a torque wrench is available, its stud is inserted into the square hole 56 and tightening to a prescribed foot poundage of torque, for example 10 foot pounds of torque, is exerted by the torque wrench on the wrench accessory 50. The large number of flats 52 on the accessory, as well as the correspondingly large number of flats 15 on the thin can 13 distribute this tightening torque uniformly to the can and, consequently, to the boss 25 to provide required tightening of the gasket 28 against the engine block. If a ratchet wrench only is available, its stud is inserted in the square hole and the wrench accessory 50 after its application to the nut-like accessory is rotated by the ratchet wrench, a prescribed amount, for example, 1¼ turns. The arrow 62 serves as a guide to indicate this prescribed amount of rotation. As the alternative to using ratchet or torque wrenches, if space permits, the handle or lever 60, inserted through holes 58 of the hub 54 may be used to effect the required tightening rotation of, for example, 1¼ turns after the gasket 28 first makes contact with the part of the engine body 12 to which it is to be sealed. As with the ratchet wrench, the arrow 62 serves as the guide to get the correct amount of tightening rotation.

Irrespective of whether a torque or ratchet wrench or the handle 60 is used, the torque applied by the accessory member 50 is conveniently and uniformly applied by it to the thin can 13 of the filter 10 because of the large number of flats 52 and 15 so that the problems of effective installation of the filter with required sealing tightening is solved.

Removal of the filter 10 is simple. The handle 60 or a torque or ratchet wrench may be used with any needed torquing force to give the unscrewing rotation to the wrench accessory 50 applied as a cap to the nut-like configuration 16 of the filter 10 that is to be removed. Even if sticking occures betweent the gasket 28 of such a filter and the engine block, the unscrewing torque exerted by accessory 50 is uniformly disributed by the large number of flats 52 and 15 and loosening of the filter 10 is easily effected without distortion or destruction of the can body 13 during such loosening.

The arrangement just described provides all the advantages set forth at the outset of this specification whereby it is possible to utilize with the wrench accessory described a screwon type filter with a very thin enclosing can and to solve all mechanical problems involved in its easy installation and removal.

The casing 13 is made by deep drawing it from a single sheet of steel having a composition and heat treatment suitable for this forming practice. Even with the temper induced by the drawer, the casing is somewhat soft and easily subject to deformation. This makes the removal problem difficult, but the very large number of flats 15 give the accessory tool 50, having the mating flats, a grip approaching continuous circumferential continuity, free from stress localizations. Torque is distributed by the tool evenly throughout the cylindrical filter casing wall and since any tendency for local deformation is prevented or at least greatly reduced by the uniform stress distribution, great torque can be transmitted through the casing wall to unscrew the filter from the engine block, without contorting the casing. The tool 50 would ordinarily be stamped from steel of the heavier gauge indicated before, so that it is inherently rigid.

In service the steel casing 13 has an elastic deformation limit sufficient to cause it to return to its normal or unstressed size after high oil pressures have swelled it from this size due to the thin gauge and hence lack of rigidity of the casing wall. This is what causes the failure problem. The very large number of flats used on the casing end make the casing shape approach a cylinder having a spherical end, a shape ideally suited to avoid the type of stress concentrations that promote fatigue failure with repeated flexures of the metal. The corners or junctions 17 and 18 are all formed as rounded shapes each having a short but definite radius in each instance. The inner ends of flats join with the cylindrical casing wall via such rounded surfaces. Nowhere are there sharp corners where stress can highly concentrate to induce early fatigue failure with the repeated flexing incidental to service.

The degree of tightness with which the filter is screwed on the engine block is important. As shown by FIG. 1 the gasket 28 is in the form of a cylindrical ring substantially longer than usual for sealing only, giving it a relatively large internal area exposed to the filter oil pressure, and made of material having the characteristic of elastically deformable rubber. With proper longitudinal compression on this gasket, it seals against oil leakage when the oil pressure is below that sufficient to rupture or blow-out the casing 13 or its end; but with an oil pressure approaching such rupturing pressure, this gasket itself blows out and relieves the oil pressure, leaving the filter intact so it may be unscrewed. Lesser longitudinal compression causes leakage; greater pressure prevents this safety feature from being operative.

Because of the above, the tool with its indicating arrow, or by permitting the use of a torque wrench, is important to the operation of the filter. Otherwise it would be impracical to screw the filter on the engine block to the right degree to provide the right compression on the gasket.

What is claimed is:

1. A screw-on type filter comprising a container having a base member with a threaded part for screwing onto an engine, the container enclosing a filter element and having a body portion and a closed end formed from metal of such thin gauge that it deforms when compressed by a conventional tightening or loosening tool, said container having a nut-like configuration in the periphery of the wall of said body portion and intersecting the closed end, said configuration having a multiplicity of flats disposed with a wide obtuse angle between each adjacent pair of flats, a rounded junction portion extending longitudinally between and being blended into the flats of each adjacent pair thereof, the junction portion being substantially convex with respect to the outer surface of the container, and an additional rounded junction portion extending circumferentially between and being blended into the flats and the closed end, the additional junction portion being substantially convex with respect to the outer surface of the container, said configuration being adapted to receive a wrench extending over said closed end and having flats matching those on the container so that turning torque applied by the wrench will be distributed uniformly to the container through the flat without distorting the container or tightening and loosening of the latter with respect to the engine.

2. A screw-on type filter comprising a container enclosed a filter element and having a base with a threaded part for screwing onto an engine part and a gasket protruding from said base for effecting a seal when the filter is installed on the engine part, said container having a body portion and a closed end, said container being of such thin gauge metal that it becomes deformed when compressed by a conventional installation and removal tool, said container having a periphery of the wall of said body portion adjacent its closed end provided integrally with a multiplicity of adjoining flats disposed with a wide obtuse angle between each adjacent pair of flats to avoid sharp corners, the flats intersecting said closed end and defining a nut-like configuration, said configuration having a rounded junction portion extending longitudinally between and being blended into the flats of each adjacent pair thereof, the junction portion being substantially convex with respect to the outer surface of the container, and an additional rounded junction portion extending circumferentially between and being blended into the flats and the closed end, the additional junction portion being substantially convex with respect to the outer surface of the container, said configuration being adapted to receive a wrench extending as a cap over said closed end during installation and removal of the filter from the engine part, said wrench including a socket-like portion having flats matching those on the container for engagement therewith to apply a turning torque thereto, whereby the turning torque thus effected by said wrench being distributed uniformly to the container through the large number of engaging flats of the container and wrench without distorting the container in tightening and loosening of the latter with respect to the engine part.

3. A fluid filter for attachment to a device having a threaded fluid passage stud and a second fluid passage opening adjacent thereto and a gasket seat surrounding both of said passages, said filter comprising a closed end container having an end wall provided with a threaded fluid passage bushing adapted to be screwed to said stud, said container being of metal of such thin gauge that it deforms when compressed by a conventional tightening or loosening tool and having a nut-like configuration in its periphery adjacent the closed end, said configuration having a multiplicity of flats disposed with a wide obtruse angle between each adjacent pair of flats, a rounded junction portion extending longitudinally between and being blended into the flats of each adjacent pair thereof, the junction portion being substantially convex with respect to the outer surface of the container, and an additional rounded junction portion extending circumferentially between and being blended into the flats and the closed end, the additional junction portion being substantially convex with respect to the outer surface of the container, said configuration being adapted to receive a wrench extending over said closed end and having flats matching those on the container so that turning torque applied by the wrench will be distributed uniformly to the container through the flats without distorting the container on tightening or loosening of the latter with respect to the engine, and a ring gasket adapted to fit said seat and seal thereagainst when the bushing is screwed to said stud, said end wall having at least one tongue member struck out from and forming a fluid port therein between said gasket and bushing, said tongue member extending from said end wall to engage said gasket with respect thereto.

(References on following page)

References Cited by the Examiner

UNITED STATES PATENTS

| | | | |
|---|---|---|---|
| 1,371,350 | 3/1921 | Campbell. | |
| 1,438,900 | 12/1922 | Chase. | |
| 1,976,914 | 10/1934 | Benjamin | 210—440 |
| 2,161,679 | 6/1939 | Kvenhold | 210—440 X |
| 2,743,019 | 4/1956 | Kovacs | 210—443 X |
| 2,797,811 | 7/1957 | Wilkinson | 210—457 |
| 2,801,751 | 8/1957 | Thomas | 210—444 X |
| 2,822,201 | 2/1958 | Wood. | |
| 2,888,141 | 5/1959 | Coates | 210—443 X |
| 2,930,409 | 3/1960 | Higgins | 220—39 X |
| 2,955,713 | 10/1960 | Colby | 210—450 |
| 3,042,215 | 7/1962 | Gruner. | |
| 3,193,101 | 7/1965 | Humbert | 210—136 X |

REUBEN FRIEDMAN, *Primary Examiner.*

HERBERT L. MARTIN, *Examiner.*

F. W. MEDLEY, *Assistant Examiner.*